(12) United States Patent
Denifl et al.

(10) Patent No.: US 7,256,150 B2
(45) Date of Patent: Aug. 14, 2007

(54) PREPARATION OF OLEFIN POLYMERIZATION CATALYST COMPONENT

(75) Inventors: Peter Denifl, Gries am Brenner (AT); Timo Leinonen, Tolkkinen (FI)

(73) Assignee: Borealis Polymers Oy, Porvoo (FI)

( * ) Notice: Subject to any disclaimer, the term of this patent is extended or adjusted under 35 U.S.C. 154(b) by 128 days.

(21) Appl. No.: 10/481,217

(22) PCT Filed: Jun. 18, 2002

(86) PCT No.: PCT/EP02/06717

§ 371 (c)(1),
(2), (4) Date: Sep. 8, 2004

(87) PCT Pub. No.: WO03/000756

PCT Pub. Date: Jan. 3, 2003

(65) Prior Publication Data

US 2005/0014662 A1    Jan. 20, 2005

(30) Foreign Application Priority Data

Jun. 20, 2001 (EP) .................................. 01115001

(51) Int. Cl.
*B01J 31/00* (2006.01)
*C08F 4/02* (2006.01)
*C08F 4/60* (2006.01)
*C08F 4/44* (2006.01)
*C08F 4/06* (2006.01)

(52) U.S. Cl. ...................... 502/127; 502/104; 502/107; 502/111; 502/125; 502/128; 502/132; 502/134; 502/169; 526/124.3; 526/124.5; 526/124.7; 526/125.8; 526/129; 526/130; 526/138; 526/142; 526/159

(58) Field of Classification Search ................ 502/104, 502/107, 111, 123, 127, 128, 132–134, 169; 526/124.3, 124.5, 124.7, 125.8, 129, 130, 526/138, 142, 159

See application file for complete search history.

(56) References Cited

U.S. PATENT DOCUMENTS

| | | | | |
|---|---|---|---|---|
| 4,399,055 A | * | 8/1983 | Matsuura et al. | ............ 502/104 |
| 4,517,307 A | * | 5/1985 | Cuffiani et al. | ............. 502/119 |
| 5,212,133 A | * | 5/1993 | Duranel et al. | ............. 502/134 |

FOREIGN PATENT DOCUMENTS

| | | | |
|---|---|---|---|
| CN | 1138790 C | | 2/2004 |
| EP | 0083074 A | | 7/1983 |
| EP | 0 083 073 | * | 10/1989 |
| EP | 0 258 089 | * | 10/1990 |
| EP | 0536840 A | | 4/1993 |
| EP | 0 713 886 | * | 7/2001 |
| GB | 2103627 A | | 2/1983 |
| WO | WO-00/08073 | | 2/2000 |
| WO | WO-00/08074 | | 2/2000 |
| WO | WO-01/38405 A1 | | 5/2001 |

OTHER PUBLICATIONS

International Search Report for PCT/EP02/06717 mailed Oct. 25, 2002.

* cited by examiner

*Primary Examiner*—Aileen Felton
*Assistant Examiner*—J. Eric McDonough
(74) *Attorney, Agent, or Firm*—McDonnell Boehnen Hulbert & Berghoff LLP

(57) ABSTRACT

A process for producing a Gp 2/transition metal olefin polymerisation catalyst component, in which a Gp 2 complex is reacted with a transition metal compound so as to produce an oil-in-oil emulsion, the disperse phase containing the preponderance of the Gp 2 metal being selectively sorbed on a carrier to provide a catalyst component of excellent morphology. Polymerisation of olefins using a catalyst containing such a component is also disclosed.

32 Claims, 3 Drawing Sheets

PREPARATION OF OLEFIN POLYMERIZATION CATALYST COMPONENT

This invention relates to a process for the preparation of a particulate olefin polymerisation catalyst component, particularly one comprising magnesium, a compound of a transition metal and an electron donor. The invention also relates to the use of such a catalyst component in the polymerisation of olefins.

BACKGROUND OF THE INVENTION

Processes for the preparation of such a catalyst component—as described, for instance, in WO 00/08073 and 00/08074—usually include a step in which a magnesium-Gp 4 metal-electron donor component is recovered by precipitation from solution, typically by contacting the solution with a large amount of an aliphatic hydrocarbon. However, such precipitation leads to a tar-like reaction product of low catalytic activity, that needs to be washed several times in order to decrease the amount of inactive Gp 4 metal complex. Aromatic hydrocarbons have also been used for the precipitation, but they lead to a very finely divided precipitate which is difficult to deposit. Worse still, it is difficult to carry out such precipitation in a controlled and reproducible manner, leading to unsatisfactory product morphology. Moreover variable and low concentrations of catalyst constituents such as butyl chloride may result, as a consequence of pre-precipitation evaporative removal of aliphatic solvent.

DESCRIPTION OF THE INVENTION

Figure 1:
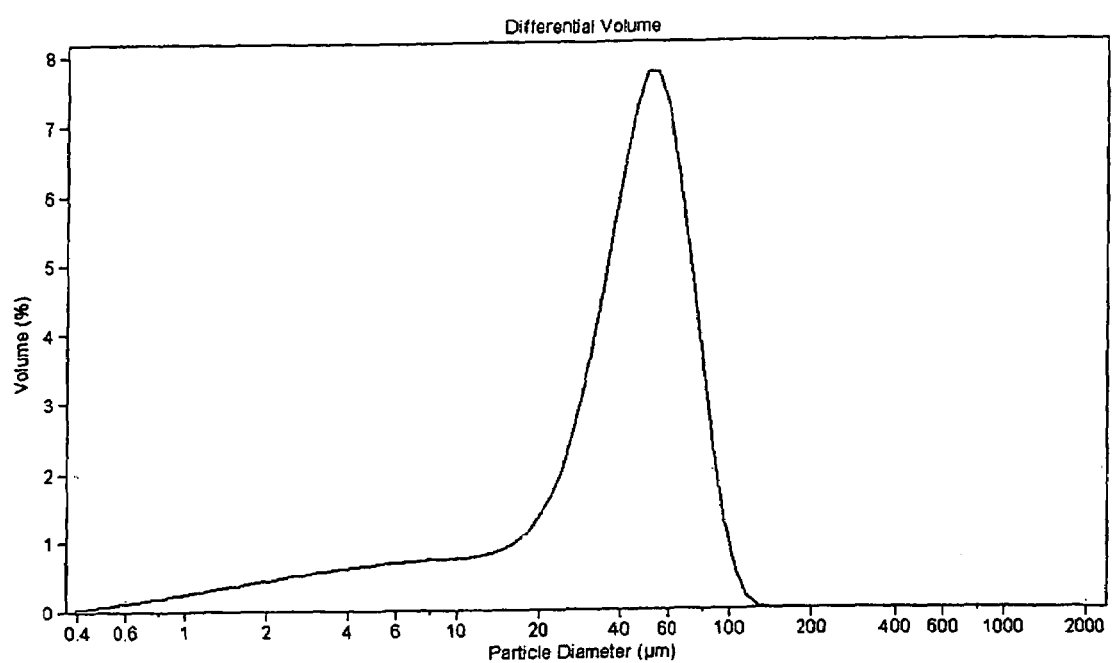
FIG. 1 is graph illustrating the particle size distribution of the catalyst produced according to Example 1 of the invention.

We have devised a new technique for recovering such a component from solution, which avoids the unsatisfactory precipitation previously practised and leads to an improved product morphology and consistent product composition.

According to the present invention a process for producing an olefin polymerisation catalyst component in the form of particles having a predetermined size range, comprises: preparing a solution of a complex of a Gp 2 metal of the Periodic Table (IUPAC, Nomenclature of Inorganic Chemistry, 1989) and an electron donor by reacting a compound of said metal with said electron donor or a precursor thereof an organic liquid reaction medium; reacting said complex, in solution, with a compound of a transition metal to produce a denser oil phase which contains more than 50 mol % of the Gp 2 metal in said complex and an oil phase immiscible therewith; preferentially sorbing said denser oil on a carrier having an average particle size of 10 to 200 μm and a pore volume of 0.5 to 4 ml/g; heating the carrier, containing said sorbed oil, to solidify said sorbed oil; and recovering, washing and drying the heated carrier to obtain said catalyst component.

The compound of a transition metal is preferably a compound of a Group 4 metal. The Group 4 metal is preferably titanium, and its compound to be reacted with the complex of a Gp 2 metal is preferably a halide. In a further embodiment of the invention a compound of a transition metal used in the process can also contain organic ligands typically used in the field known as a single site catalyst. In a still further embodiment of the invention a compound of a transition metal can also be selected from Group 5 metals, Group 6 metals, Cu, Fe, Co, Ni and/or Pd. The complex of the Group 2 metal is preferably a magnesium complex. The invention will henceforth be described in relation to a preferred embodiment of the process, namely to a process for the preparation of a Ziegler-Natta type catalyst.

This preferred embodiment of the invention is a process for producing catalysts of the Ziegler-Natta type, in the form of particles having a predetermined size range, comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one fourvalent Gp 4 metal at a temperature greater than 10° C. and less than 60° C., to produce a denser, T1C14/toluene-Insoluble, oil dispersed phase having Gp 4 metal/Mg mol ratio 0.1 to 10 and an oil immiscible therein having Gp 4 metal/Mg mol ratio 10 to 100; preferentially sorbing said denser oil on a carrier having an average particle size of 10 to 200 μm and a pore volume of 0.5 to 4 ml/g, heating the carrier containing said sorbed oil to solidify said sorbed oil, and recovering, washing and drying the carrier to obtain said catalyst component.

The two oil phases produced from the Mg-complex/Gp 4 metal component reaction are thus distinguishable from one another by the fact that the denser oil, if contacted with a solution of titanium tetrachloride in toluene, will not dissolve in it. A suitable solution for establishing this criterion would be one having a Ti:toluene mol ratio of 0.1 to 0.3. They are also distinguishable by the fact that the great preponderance of the Mg provided (as complex) for the reaction with the Gp 4 metal compound is present in the denser oil phase, as revealed by comparison of the respective Gp 4 metal/Mg mol ratios.

In effect, therefore, virtually the entirety of the reaction product of the Mg complex with the Gp 4 metal—which is the precursor of the ultimate catalyst component—becomes the denser oil phase, and proceeds through the further processing steps to final dry particulate form. The lighter phase, immiscible therewith, still containing a useful quantity of Gp 4 metal, can be reprocessed for recovery of that metal.

The production of a two-phase, rather than single-phase (as in prior practice) reaction product is encouraged by carrying out the Mg complex/Gp 4 metal compound reaction at low temperature, specifically above 10° C. but below 60° C., preferably above 30° C. and below 50° C.

The carrier may be present during the reaction, added to the reaction mixture either independently or as a suspension in one of the reagent solutions. Alternatively, it may be added after reaction has been completed. When it is present during the reaction, phase separation may not be observed since the denser oil will be sorbed by the carrier as it is formed.

Since the Mg complex/Gp 4 metal compound reaction product occupies the internal pore volume of the carrier, the morphology of the ultimately obtained catalyst component is the same as that of the carrier itself. Accordingly, catalyst component morphology is easily predetermined, by appropriate selection of carrier. This morphology is preserved during the heating to solidify the sorbed oil, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, dioctyl phthalate being particularly preferred. It may be formed in situ by reaction of an aromatic carboxylic acid chloride precursor with a $C_2$-$C_{16}$ alkanol and/or diol. The liquid reaction medium preferably comprises toluene.

The Gp 4 metal is typically titanium, and is advantageously used as the halide. It is preferably reacted with the magnesium complex at a temperature of 20 to 30° C. The carrier may comprise a refractory inorganic oxide, a salt or an organic polymer having a softening point greater than 150° C. Examples of favoured materials include silica, magnesium chloride and cross linked polystyrene resin.

The process is advantageously conducted at a Gp 4 metal/Mg mol ratio of the denser oil of 2 to 4 and, of the oil immiscible therewith, 55 to 65. The carrier may be added to the product of the reaction between said Mg complex and said Gp 4 metal compound, although in an equally favoured procedure it is added to the Gp 4 metal compound before reaction thereof with the Mg complex. Typically the mol ratio of Mg in the denser oil to Mg in the oil immiscible therewith is $\leq 0.1$.

The carrier containing sorbed oil is heated to a temperature of 70-150° C. to solidify that oil, preferably to 90-110° C. The preparation of the magnesium complex is suitably carried out at a temperature of 20 to 80° C., temperatures of 50 to 70° C. being preferred.

The obtained catalyst component is, like the carrier, in the form of particles having an average size range of 10 to 200 μm. Preferably at least 50 vol % of the particles have a size range of 20 to 50 μm.

Before reaction with the Gp 4 compound, a surface active agent may be added to the solution of the magnesium complex to encourage product phase separation, sorbitan tristearate being a suitable material. Moreover, the magnesium complex and compound of a fourvalent Gp 4 metal may be reacted in the presence of additional electron donor.

The invention further comprehends an olefin polymerisation catalyst comprising a catalyst component prepared as aforesaid, in association with an alkylaluminium cocatalyst: and the use of such a catalyst for the polymerisation of $C_2$ to $C_{10}$ α-olefins.

The reagents can be added to the aromatic reaction medium in any order. However it is preferred that in a first step the alkoxy magnesium compound is reacted with a carboxylic acid halide precursor of the electron donor to form an intermediate which then reacts with the diol; and in a second step the obtained product is further reacted with the Gp 4 metal. The magnesium compound preferably contains from 1 to 20 carbon atoms per alkoxy group, and the carboxylic acid should contain at least 8 carbon atoms.

Reaction of the magnesium compound, carboxylic acid halide and polyhydric alcohol proceeds satisfactorily at temperatures in the range 20 to 80° C., preferably 50 to 70° C. The product of that reaction, the "Mg complex", is however reacted with the Gp 4 metal compound at a lower temperature, contrary to previous practice, to bring about the formation of a two-phase product.

Use of the aromatic medium for preparation of the Mg complex contributes to consistent product morphology and higher bulk density. Catalyst bulk density and morphology correlate with product bulk density and morphology—the so-called "replication effect".

Moreover the technique adopted in the novel regimen of the invention is inherently more precise than that formerly employed, and thus further contributes to product consistency, as well as sharply reducing the volumes of solvent to be handled and thus improving process economics.

The aromatic liquid reaction medium used as solvent in the reaction is preferably selected from hydrocarbons such as substituted and unsubstituted benzenes, preferably from alkylated benzenes, more preferably from toluene and the xylenes, and is most preferably toluene. The reaction medium can also be a mixture of said aromatic hydrocarbons and aliphatic hydrocarbons containing preferably 5-9, more preferably 5-7 carbon atoms.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene. A further wash is advantageously performed with heptane, most preferably with hot (e.g. 90° C.) heptane, and yet a further wash with pentane. A washing step typically includes several substeps. A favoured washing sequence is, for example, one wash with toluene at 90° C., two washes with heptane at 90° C. and one or two washes with pentane at room temperature.

The washing can be optimised to give a catalyst with novel and desirable properties. Finally, the washed catalyst component is dried, as by evaporation or flushing with nitrogen.

The molar ratio of said aromatic medium to magnesium is preferably less than 10, for instance from 4 to 10, preferably from 5 to 9 and most preferably from 6 to 8.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 183 1, "a derived name of compounds of higher order, which originate from the combination of molecules,—unlike compounds of first order, in the creation of which atoms participate".

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesium, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula R2Mg, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol R'(OH)$_m$ or a mixture thereof with a monohydric alcohol R'OH. The use of a polyhydric alcohol R'(OH)$_m$ improves the morphology of the catalyst component compared to the use of a monohydric alcohol alone.

Typical $C_2$ to $C_{16}$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, trimethylol propane and pentareythritol. The polyhydric alcohol can be selected on the basis of the activity and morphology it gives the catalyst component. E.g. larger particle size and broader particle size distribution can be obtained by using ethylene glycol.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt.amyl alcohol, sec.isoamyl alcohol, tert.butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$Cl_{10}$ monohydric alcohols: are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The compound of a four-valent Gp 4 metal compound containing a halogen is preferably a titanium tetrahalide. Equivalent to titanium tetrahalide is the combination of an alkoxy titanium halide and a halogenation agent therefor, which are able to form a titanium tetrahalide in situ. The most preferred halide is the chloride, for zirconium and hafnium as well as for titanium.

The reaction conditions used in the claimed process may be varied according to the used reactants and agents.

As is known, the addition of at least one halogenated hydrocarbon during the process can lead to further improved catalytic activity. Reactive halogenated hydrocarbons preferably have the formula R'''X''', wherein R''' is an n-valent $C_1$-$C_{20}$ hydrocarbyl group, particularly a $C_1$-$C_{10}$ paraffin, X''' is a halogen and n is an integer from 1 to 4.

Such chlorinated hydrocarbons include monochloromethane dichloromethane, trichloromethane (chloroform), tetrachloromethane, monochloroethane, (1,1)-dichloroethane, (1,2)-dichloroethane, (1,1,1)trichloroethane, (1,1,2)-trichloroethane, (1,1,1,2)-tetrachloroethane, (1,1,2,2)-tetrachloroethane, pentachloroethane, hexachloroethane, (1)-chloropropane, (2)chloropropane, (1,2)-dichloropropane, (1,3)-dichloropropane, (1,2,3)trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons may also be unsaturated, provided that the unsaturation does not act as catalyst poison in the final catalyst component.

In the above formula, R''' is preferably a mono-or bivalent $C_1$-$C_{10}$ alkyl group, independently, X''' is preferably chlorine and, independently, n is preferably 1 or 2. Preferred compounds include butyl chloride (BuCl), dichloroalkanes such as (1,4)-dichlorobutane, and tertiary butyl chloride.

Some preferred embodiments of the invention are described, by way of illustration, in the following Examples.

EXAMPLE 1

A magnesium complex solution was prepared by adding over a 40 minute period, with stirring, 110 ml of a 20% solution in toluene of BOMAG A [Mg(u-Bu)1.5(Oct)0.5] (butyloctyl magnesium) (Tradename) to 38.9 ml of 2-ethylhexanol which had been cooled to 5° C. in a 300 ml glass reactor. During the addition the reactor contents were maintained below 15° C. The temperature was then raised to 60° C. and held at that level for 30 minutes with stirring, at which time the reaction was complete. 6.4 ml phthaloyl chloride was then added over an 11 minute period. The reactor contents were stirred at 60° C. for 20 minutes, 12.9 ml 1-chlorobutane was added, and stirring continued for another 15 minutes at 60° C. The resulting stable, yellow Mg complex solution was cooled to room temperature.

19.5 ml $TiCl_4$, 10 ml n-pentane and 32.0 g of the above-prepared Mg complex solution were reacted with stirring at 25° C. in a 300 ml glass reactor. After 5 minutes, reaction was complete and a dark red emulsion had formed. To this emulsion were added 2.0 g of a 40 μm particle size silica (silica SYLOPOL 55SJ, Grace) in 2.0 ml $TiCl_4$ and the temperature of the mixture was raised to 90° C. over 30 minutes and maintained at that temperature, with stirring, for a further 30 minutes. After settling and syphoning the solids underwent washing with:

1. 100 ml toluene+5 ml $TiCl_4$ at 90° C. for 30 minutes,
2. 60 ml heptane, at 90° C. for 10 minutes;
3. 60 ml heptane, at 90° C. for 10 minutes;
4. 60 ml pentane, at room temperature for 5 minutes, and
5. 60 ml pentane, at room temperature for 5 minutes.

The solids were then dried at 60° C. by nitrogen purge, to yield a yellow, air-sensitive powder. The particle size distribution of the powder is shown in FIG. 1.

EXAMPLE 2

A magnesium complex solution was prepared by adding over a 60 minute period, with stirring, 90 ml of a 20% solution in toluene of BOMAG A [Mg(u-Bu)1.5(Oct)0.5] (butyloctyl magnesium) (Tradename) to 31.8 ml of 2-ethylhexanol which had been cooled to 5° C. in a 300 ml glass reactor. During the addition the reactor contents were maintained below 15° C. The temperature was then raised to 60° C. and held at that level for 30 minutes with stirring, at which time was reaction was complete. 4.0 ml 1,2-phthaloyl chloride was then added over a 4 minute period. The reactor contents were stirred at 60° C. for 90 minutes. The resulting stable, yellow Mg complex solution was allowed to cool to room temperature.

To a well-stirred suspension of 2.0 g of 20 μm particle size silica (Crosfield, ES747 JR) in 19.5 ml of $TiCl_4$ in a 300 ml glass reactor at 25° C. were added 32 g of the above-prepared Mg complex, over a period of 1 minute. The temperature was increased to 90° C. over 30 minutes, and held at that temperature for a further 30 minutes, with continuation of the stirring.

Figure 2:
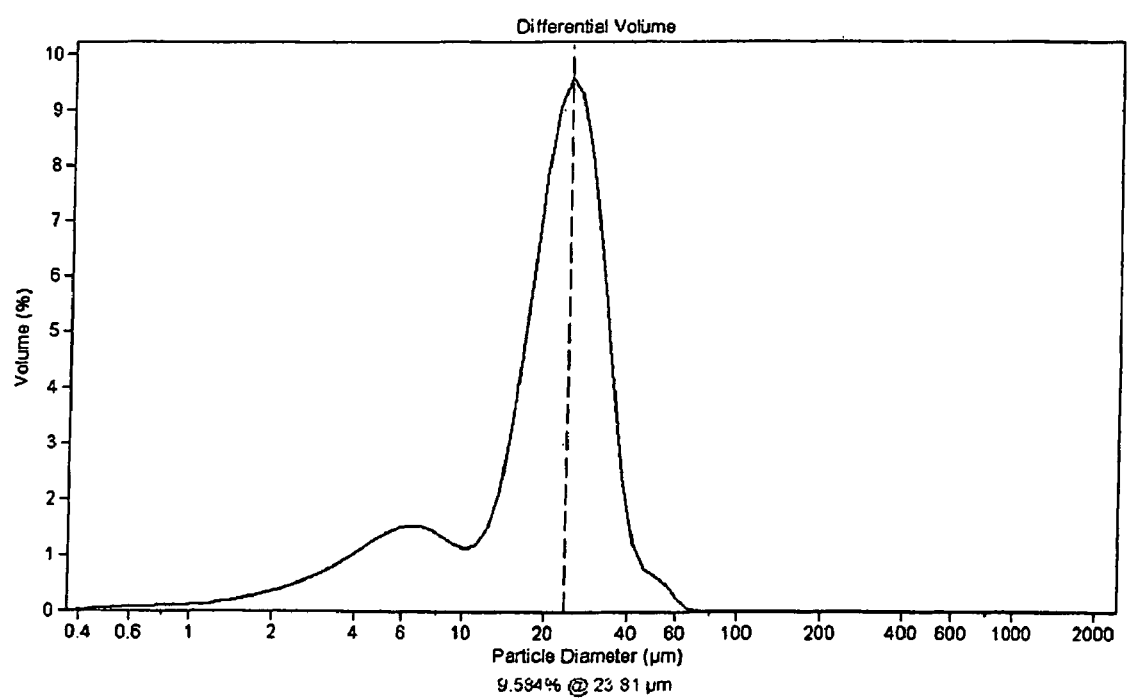
FIG. 2 is graph illustrating the particle size distribution of the catalyst produced according to Example 2 of the invention.

The solids were then recovered, washed and dried as in Example 1, yielding a yellow, air-sensitive powder. The particle size distribution of the powder is shown in FIG. 2.

EXAMPLE 3

Figure 3:
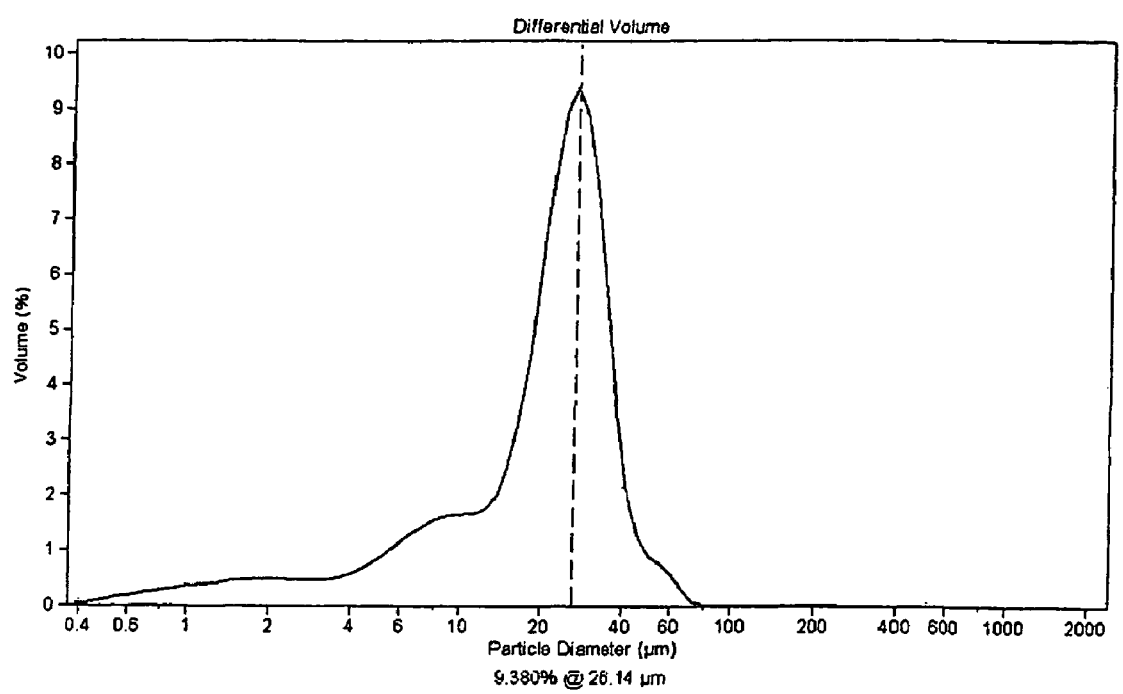
FIG. 3 is graph illustrating the particle size distribution of the catalyst produced according to Example 3 of the invention.

Example 2 was repeated, but with the addition of the Mg complex to the $TiCl_4$ suspension being performed at 50° C., the temperature thereafter being increased to 110° C. The particle size distribution of the product is shown in FIG. 3.

The composition of the products of Examples 1 to 3 is summarised in the following table:

TABLE 1

| Example | Ti % | Mg % | DOP %* |
|---|---|---|---|
| 1 | 2.7 | 7.3 | 8.04 |
| 2 | 4.1 | 6.4 | 15.0 |
| 3 | 5.2 | 10.4 | 15.2 |

*Di (2-ethyl-hexyl) phthalate (internal electron donor)

EXAMPLES 4, 5 AND 6

The products of Examples 1 to 3 were evaluated as catalyst components in propylene polymerisation in the following manner.

0.9 ml triethyl aluminium (TEA) (co-catalyst), 0.12 ml cyclohexyl methyl dimethoxy silane (CMMS) as an external donor and 30 ml n-pentane were mixed and allowed to react for 5 minutes. Half of the mixture was then added to a polymerisation reactor and the other half was mixed with 20 mg of components prepared in Examples 1 to 3. After an additional 5 minutes the component TEA/donor/n-pentane mixture was added to the reactor. The Al/Ti mole ratio of the resulting polymerisation catalyst was 250 mol/mol and the Al/CMMS mole ratio was 10 mol/mol.

Propylene standard bulk polymerisation was carried out in a stirred 5 l tank reactor.

70 mmol hydrogen and 1400 g propylene were introduced into the reactor and the temperature was raised within 15 minutes to the polymerisation temperature of 70° C. The polymerisation time: at 70° C. was 60 minutes, after which the polymer formed was taken out from the reactor. Example 4 employed the catalyst containing component of Example 1, Example 5 that of Example 2, Example 6 that of Example 3.

The results of the polymerisation evaluations are summarised in the following Table, which also present the analysis.

TABLE 2

| Example | Activity KgPP/gCat | MFR[1] G/10 m in | XS[2] % | BD[3] G/ml | % particles <0.1 mm |
|---|---|---|---|---|---|
| 4 | 26.7 | 5.1 | 2.2 | 0.41 | 0.3 |
| 5 | 26.5 | 4.4 | 2.0 | 0.45 | 0.2 |
| 6 | 23.2 | 5.0 | 2.0 | 0.42 | 0.4 |

[1]ISO 1133, 2.16 kg load at 230° C.
[2]xylene-soluble fraction of product at 25° C.
[3]polymer-bulk density (ASTM D 1895)

The invention claimed is:

1. A process for producing an olefin polymerisation catalyst component in the form of particles, comprising:
    preparing a solution of a complex of a Group 2 metal and an electron donor by reacting a compound of said Group 2 metal with said electron donor or a precursor thereof in an organic liquid reaction medium;
    reacting said complex, in solution, with at least one compound of a transition metal to produce two oils, wherein the first oil is denser oil comprising more than 50 mol % of the Group 2 metal in said complex and the second oil is a lighter oil being immiscible with the denser oil;
    preferentially sorbing said denser oil into a porous carrier comprising carrier particles having an average particle size of 10 to 200 μm and a pore volume of 0.5 to 4 ml/g;
    solidifying said sorbed oil contained by said carrier, wherein said solidified sorbed oil comprises catalyst component particles; and
    recovering, washing and drying the carrier to obtain said catalyst component particles.

2. A process according to claim 1 wherein said transition metal is a Group 4 metal.

3. A process according to claim 1 or claim 2 wherein said Group 2 metal is magnesium.

4. A process according to claim 1 or claim 2 wherein said organic liquid reaction medium comprises a $C_6$-$C_{10}$ aromatic hydrocarbon or a mixture of a $C_6$-$C_{10}$ aromatic hydrocarbon and $C_5$-$C_9$ aliphatic hydrocarbons.

5. A process according to claim 2 wherein said Group 2 metal is magnesium and said denser oil is a $TiCl_4$/toluene-insoluble oil having a Group 4 metal/Mg mol ratio greater than 0.1 and less than 10 and said oil immiscible therewith has a Group 4 metal/Mg mol ratio of 10 to 100.

6. A process according to claim 5 wherein the Group 4 metal/Mg mol ratio of said immiscible oil is 20 to 80.

7. A process according to claim 6 wherein the Group 4 metal/Mg mol ratio of said immiscible oil is 45 to 75.

8. A process according to claim 1 or claim 2 wherein said complex and said transition metal compound are reacted at a temperature of 10° C. to 60° C.

9. A process according to claim 1 or claim 2 wherein the solidification of said sorbed oil particles is effected by heating.

10. A process according to claim 1 or claim 2 wherein said electron donor is an aromatic carboxylic acid ester.

11. A process according to claim 10 wherein said electron donor is dioctyl phthalate.

12. A process according to claim 1 or claim 2 wherein said electron donor is formed in situ by reaction of an aromatic carboxylic acid chloride precursor with a $C_2$-$C_{16}$ alcohol and/or diol.

13. A process according to claim 1 or claim 2 wherein said organic liquid reaction medium comprises toluene.

14. A process according to claim 2 wherein said Group 4 metal is titanium.

15. A process according to claim 2 wherein said compound of a Group 4 metal is a halide.

16. A process according to claim 3 wherein said transition metal compound is a Group 4 metal compound and said magnesium complex and Group 4 metal compound are reacted at a temperature of greater than 20° C. to less than 50° C.

17. A process according to claim 1 or claim 2 wherein said carrier comprises a refractory inorganic oxide, a salt or an organic polymer having a softening point greater than 150° C.

18. A process according to claim 17 wherein said carrier comprises silica, magnesium chloride or cross-linked polystyrene resin.

19. A process according to claim 3 wherein said transition metal compound is a Group 4 metal compound and the Group 4 metal/Mg mol ratio of said denser oil is 2 to 4 and the Group 4 metal/Mg mol ratio of the oil immiscible therewith is 55 to 65.

20. A process according to claim 3 wherein said transition metal compound is a Group 4 metal compound and the carrier is added to the product of the reaction between said Mg complex and said Group 4 metal compound.

21. A process according to claim 3 wherein said transition metal compound is a Group 4 metal compound and the carrier is added to said Group 4 metal compound before reaction thereof with said Mg complex.

22. A process according to claim 3 wherein the mol ratio of Mg in said denser oil to Mg in said oil immiscible therewith is less than 0.1.

23. A process according to claim 1 or claim 2 wherein the carrier containing the sorbed oil is heated to a temperature of 70° C. to 150° C. to solidify said sorbed oil.

24. A process according to claim 1 or claim 2 wherein the carrier containing the sorbed oil is heated to a temperature of 90° C. to 110° C.

25. A process according to claim 3 wherein the preparation of the magnesium complex is carried out at a temperature of 20° C. to 80° C.

26. A process according to claim 25 wherein the preparation of the magnesium complex is carried out at a temperature of 50° C. to 70° C.

27. A process according to claim 1, wherein said catalyst component particles have an average size range of 20 to 50 µm.

28. A process according to claim 3 wherein said transition metal compound is a Group 4 metal compound and wherein a surface active agent is added to the solution of the magnesium complex before reaction with the Group 4 metal compound.

29. A process according to claim 28 wherein said surface active agent is a sorbitan tristearate.

30. A process according to claim 28 wherein the magnesium complex and a compound of a tetravalent Group 4 metal are reacted in the presence of an additional electron donor.

31. An olefin polymerisation catalyst comprising a catalyst component prepared according to the process of claim 1 or claim 2 and an alkylaluminum cocatalyst.

32. A method of polymerizing $C_2$ to $C_{10}$ α-olefins, the method comprising combining a catalyst component prepared according to claim 1, an alkylaluminum cocatalyst, at least one $C_2$ to $C_{10}$ α-olefin or a mixture of $C_2$ to $C_{10}$ α-olefins and optionally an external donor in a polymerization reactor; and polymerizing said $C_2$ to $C_{10}$ α-olefin or said mixture of $C_2$ to $C_{10}$ α-olefins.

* * * * *